United States Patent [19]

Sekigawa

[11] Patent Number: 5,530,599
[45] Date of Patent: Jun. 25, 1996

[54] APPARATUS FOR COMPENSATING A DELAY TIME OF TIME CODE SIGNAL USED IN A DIGITAL AUDIO TAPE RECORDER

[75] Inventor: Kaoru Sekigawa, Kanagawa, Japan

[73] Assignee: Sony Corporation, Tokyo, Japan

[21] Appl. No.: 808,160

[22] Filed: Dec. 13, 1991

[30] Foreign Application Priority Data

Dec. 25, 1990 [JP] Japan .................................. 2-412917

[51] Int. Cl.⁶ .................................................. G11B 20/20
[52] U.S. Cl. ............................................ 360/26; 360/36.1
[58] Field of Search ............................. 360/26, 32, 36.1

[56] References Cited

U.S. PATENT DOCUMENTS

| 4,074,332 | 2/1978 | Innes | 360/26 X |
| 5,130,864 | 7/1992 | Shimada | 360/32 X |

FOREIGN PATENT DOCUMENTS 0237020  9/1987  European Pat. Off. .................. 360/32

Primary Examiner—Aristotelis Psitos
Assistant Examiner—J. P. Wright
Attorney, Agent, or Firm—William S. Frommer; Alvin Sinderbrand

[57] ABSTRACT

A digital tape recorder is provided in which main digital signals and time code signals are recorded on a magnetic tape after realization of the timing concurrence between these signals. To this end, a delay correction circuit 23 for delaying the input time code signals by a delay time at an A/D converter 13 or a delay time at a digital input interfacing circuit 16 are provided. The input time code signals delayed by the delay correction circuit 23 and main digital signals from the A/D converter 13 or the digital input interfacing circuit 16 are transmitted to an encoder 17 and recorded on the tape 30 in such a state in which the in-line relationship or timing concurrence is maintained between these main digital signals and the time code signals.

12 Claims, 2 Drawing Sheets

APPARATUS FOR COMPENSATING A DELAY TIME OF TIME CODE SIGNAL USED IN A DIGITAL AUDIO TAPE RECORDER

BACKGROUND OF THE INVENTION

This invention relates to an apparatus for compensating a delay time of time code signal used in a digital tape recorder and to a digital tape recorder in which at least so-called time code signals functioning as position information on a magnetic tape are recorded together with main signals, such as audio signals.

In a tape recorder for recording analog signals in general, such as analog audio signal tape recorders for ordinary business use, so-called time code signals are usually recorded as the time information or tape position information useful for tape editing. Since these time code signals are recorded simultaneously with the main recording/reproducing signals, such as analog/audio signals, the in-line relationship, or timing concurrence, is maintained between the analog/audio signals and the time code signals.

However, when the analog/audio signals are converted into digital signals for recording or reproduction, such timing concurrence can not be maintained between the extraneous time code signals and the recording/reproducing signals because of delays produced at the time of audio/digital (A/D) conversion at the recording side or digital/audio (D/A) conversion at the reproducing side.

OBJECT AND SUMMARY OF THE INVENTION

In view of the above described status of the art, it is a principal object of the present invention to provide a digital tape recorder for recording and/or reproducing the main signals in the form of digital signals, in which timing concurrence may be maintained between these main signals and the time code signals.

In accordance with the present invention, there is provided an apparatus for compensating a phase relationship between external time code signal and input analog audio signal or digital audio signal so that said analog or digital audio signal can be recorded in phase, comprising;

first input terminal for receiving a digital audio signal, second input terminal for receiving an analog audio signal, third input terminal for receiving an external time code signal, analog to digital converter connected to said second input terminal for converting said analogue audio signal to digital audio signal, signal processing means for processing said time code signal, said digital audio signal and on output signal of said analogue to digital converter so that those signals are formatted favorably to be recorded, switching means for selectively applying said digital audio signal and said output signal of said analogue to digital converter to said signal processing means, means for controlling a phase of said external time code signal in response to a selection of said digital audio signal or said output signal of said anolog to digital converter, and for applying a phase controlled external time code signal to said signal processing means, and recording means for recording one of said digital audio signal or said output signal of said analogue to digital converter, and said phase controlled external time code signal.

The present invention also provides a digital tape recorder comprising an A/D converter for converting analog input signals into digital signals and/or a digital input interfacing circuit for converting the digital input signals into digital signals for internal signal processing, a delay correction circuit for delaying the time code input signals by a time corresponding to the time delay produced in said A/D converter and/or the digital input interfacing circuit, and an encoder for encoding output signals from said A/D converter and/or the digital input interfacing circuit and output signals from said delay correcting circuit. When both of the A/D converter and the digital input interfacing circuit are employed, a changeover switch is provided for selectively outputting one of the output signals from the A/D converter and the digital input interfacing circuit and the delay time in the delay correction circuit is switched to one of the delay time corresponding to the time delay at the A/D converter and the delay time corresponding to the time delay at the digital input interfacing circuit for correspondingly delaying the time code input signals.

Since the time code input signals are delayed in the delay correction circuit by a time equal to the delay time at the A/D converter of a time equal to the delay time at the digital input interfacing circuit, with respect to the main digital signals, the time code signals are transmitted to the encoder after correct timing matching, so that recording may be performed in such a state in which the in-line relationship or timing concurrence is maintained between the main digital signals and the time code signals.

DESCRIPTION OF THE PREFERRED EMBODIMENT

Referring to the accompanying drawings, an illustrative embodiment of the present invention will be explained in detail.

Figure 1:
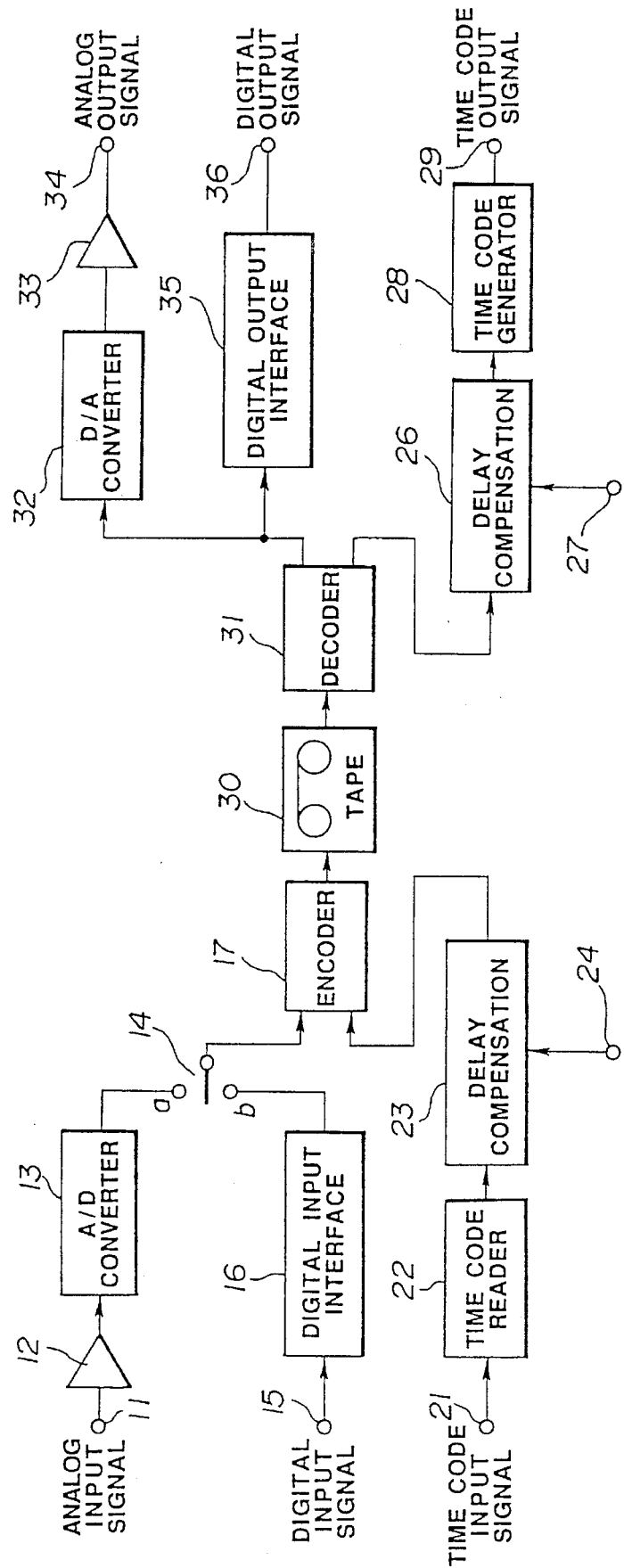
FIG. 1 is a block circuit diagram showing the schematic construction of a digital tape recorder according to the present invention.

FIG. 1 shows the schematic construction of the digital tape recorder according to the present invention. Analog signals, for example, are supplied to an analog input terminal 11. These analog audio input signals are supplied via an amplifier 12 to an analog/digital (A/D) converter 13 so as to be converted into digital signals which are transmitted to a fixed contact a of a changeover switch 14. Digital audio signals, for example, are supplied to a digital input terminal 15. Typical of these digital audio signals are signals conforming to the serial transmission format for digital audio signals of the so-called AES/EBU (Audio Engineering Society/European Broadcast Union) standards. These digital input signals are converted by a digital input interfacing circuit 16 from the AES/EBU signals into digital signals conforming to a format suited to inner processing within the digital tape recorder before the signals are transmitted to a fixed terminal b of the changeover switch 14. The output signals from the changeover switch 14, in the form of digital audio signals, are supplied to an encoder circuit 17 for error correction, interleaving, RF modulation or the like processing operations.

To a time code input terminal 21, there are supplied so-called time code signals in which the tape position information or the time information, useful for tape editing, is depicted as hour, minute, second and frame. These time code input signals are read by a time code reader 22 before being supplied to a circuit for compensating a time delay or a delay correction circuit 23. This delay correction circuit 23 is adapted for delaying the input signals by a time delay which may be switchingly selected in accordance with a delay control signal from a changeover control terminal 24. These selectable time delays include a first delay time for compensating a delay produced in the A/D converter 13 and a second delay time produced in the digital interfacing circuit 16. These delay times are selected in accordance with the switching states at the changeover switch 14, so that the first delay time is selected when a movable contact of the switch 14 is set to the fixed terminal a for supplying output signals from the A/D converter 13 to the encoder circuit 17 and the second delay time is selected when the movable contact of the switch 14 is set to the fixed terminal b for supplying output signals from the interfacing circuit 16 to the encoder circuit 17. The output signals from the delay correcting circuit 23 are supplied to the encoder circuit 17.

Figure 2:
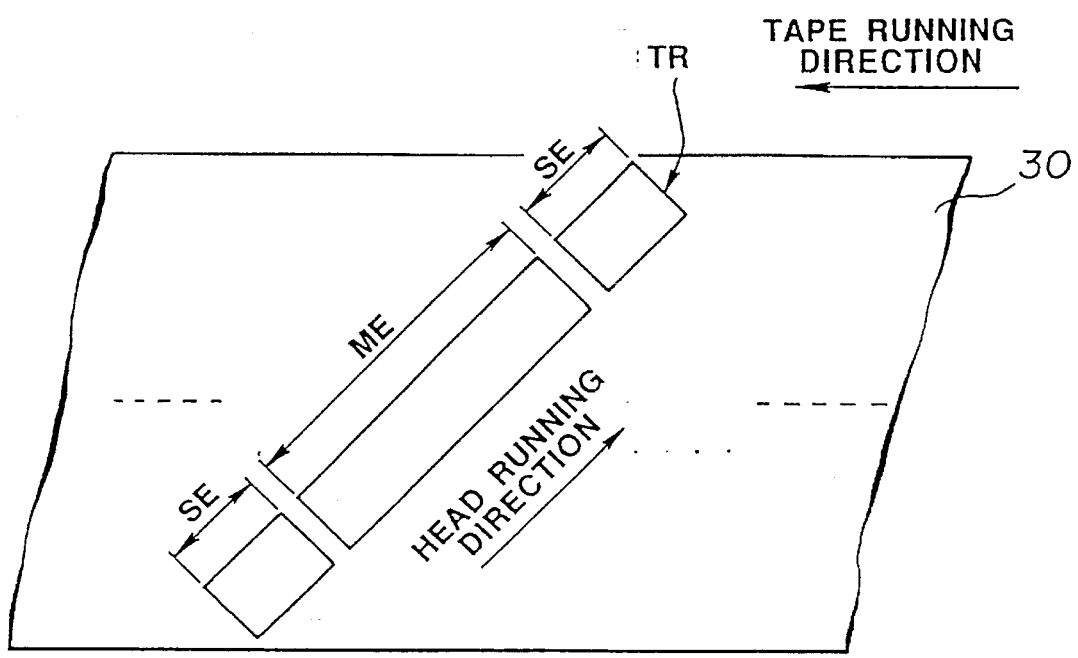
FIG. 2 is a schematic view showing a recording track on a magnetic tape of a rotary head type digital audio tape recorder.

The output signals from the encoder circuit 17 are recorded for forming an obliquely extending recording track TR on a magnetic tape 30 by a rotary head as shown in FIG. 2. This recording track TR is made up of a main area ME at a mid portion of the track and two subcode areas SE on either side of the main area ME. In the main area ME, there are recorded data signals which are main signals or digital audio signals from the changeover switch 14 processed by the encoder circuit 17 with the error coding, interleaving, RF modulation or the like. In the subcode areas SE, there are recorded various ancillary data to the main digital audio signals, such as the time code data from the delay correction circuit 23, sampling frequency, channel number, program number or the like data.

An exemplary correcting operation by delay correction circuit 23 is hereinafter explained in connection with actual time code data.

Time code data are usually expressed by four numerals of hours, minutes, seconds and frames. With a rotary head type digital audio tape recorder, or so-called R-DAT, since the rotary head is rotated at 2,000 rpm or 100/3 Hz, a difference in length or period is produced between an R-DAT data frame (for two tracks) and a time code data frame. For this reason, with the R-DAT, a dedicated time code having a frame duration of 3/100 second corresponding to the period of head rotation is employed. On the other hand, a phase difference at a reference time 00:00:00:00 of the input time code is expressed in terms of the number of words, and the time code dedicated to R-DAT, or so-called R-TIME, is recorded so that this number of words is also taken into account. With the R-TIME, the time code dedicated to R-DAT, 33 or 34 frames are counted per second, from the frame period of 3/100 second. The number of words per frame is 1440 and 1323 for the sampling frequencies of 48 kHz and 44.1 kHz, respectively. The frame frequencies of the time codes accepted in general are 30 Hz, 29.97 Hz, 25 Hz and 24 Hz, depending on the particular systems. For the frame frequency of 30 Hz, for example, the number of words per frame is 1600 and 1470 for the sampling frequencies of 48 kHz and 44.1 kHz, respectively.

The delay correction circuit 23 corrects the input time code data into the total number of words from the reference time 00:00:00:00 and also calculates the quantity of delay correction in terms of the number of words. The correction circuit 23 then sums these numbers together before conversion into the time code in the form of hour:minute:second::frame. That is, the conversion between the time code in general and the R-TIME is carried out in such a manner that the total number of words from the reference time 00:00:00:00 is used as intermediate data and an offset based on the number of words corresponding to the delay time to be corrected is annexed in case the intermediate data is used. In this manner, correction of delay time by the delay correction circuit 23 may be achieved easily.

If the delay time between the input and the output of the A/D converter 13 is 35 (or 42) words, and that between the input and the output of the digital interfacing circuit is 4 (or 11) words, the delay correction circuit 23 is set so as to be switched between the 35 words and the 4 words of the delay time or between the 42 words and the 11 words of the delay time. In the case of digital recording of the analog audio signals, supplied to the input terminal 11, the movable terminal of the changeover switch 14 is set to the fixed contact a, at the same time that a switching control signal corresponding to the switching state is supplied to the switching control terminal 24 of the delay correction circuit 23 for switching the correction circuit 23 to the delay state of the 35 (or 42) words. On the contrary, in the case of digital recording of the digital audio signals, supplied to the input terminal 15, the movable terminal of the changeover switch 14 is set to the fixed contact b, at the same time that a switching control signal corresponding to the switching state is supplied to the switching control terminal 24 for switching to the delay state of the 4 (or 11) words.

In this manner, the relative timing between the input digital audio signals and the time code signals to the encoder 17 may be identified with that between the input analog or digital audio signals and the input time code signals for maintaining the so-called in-line relationship (timing concurrence) between the digital audio signals and the time code signals.

The above described arrangement for the recording side may be adopted to that for the reproducing side so that the in-line relationship or timing concurrence may be maintained easily with the aid of the delay correction circuit.

That is, the signals obtained by the rotary head scanning the recording track TR on the tape 30 as shown in FIG. 2 are transmitted to a decoding circuit 31 so as to be processed with, for example, RF demodulation, deinterleaving, error detection and error correction, so that the main digital signals, for example, the above mentioned digital audio signals, are outputted along with the subcode signals. The digital audio signals from the decoding circuit 31 are converted in a digital/analog (D/A) converter 32 into analog audio signals so as to be outputted via amplifier 33 at an output terminal 34. Alternatively, the digital audio signals from the decoding circuit 31 are transmitted to a digital output interfacing circuit 35 so as to be converted into, for example, digital audio data conforming to the serial transmission format of the above mentioned AES/EBU standard before being outputted at output terminal 36. The time code data in the subcode signals from the decoder 31 are transmitted to a time code generator 28 by means of a delay correction circuit 26 before being outputted as time code output signals at output terminal 29.

The delay correction circuit 26 is designed to output input signals with a time delay which may be set in accordance with a switching control signal from a switching control terminal 27. As this time delay, a first delay time for compensating the time delay produced in outputting the input signal due to, for example, the conversion process at the D/A converter 32, and a second delay time for compensating the time delay produced between the input and the output of the interfacing circuit 35, are provided, and one of these signals is selected depending on whether the output signals are outputted at the output terminals 34 or 36. That is, the first delay time is selected when the analog audio signals outputted at the output terminal 34 are desired and the second delay time is selected when the digital audio signals outputted at the output terminal 36 are desired. For performing such selection, a manually operable changeover switch, not shown, may be provided on, for example, an operating panel of the digital tape recorder, for selecting the output signals at the output terminals 34 or 36.

The delay correction circuit 26 may be arranged in the same manner as the above described delay correction circuit 23. Specifically, the time code data reproduced from the tape 30 are expressed as the intermediate data in terms of the total number of words from the above mentioned reference time 00:00:00:00, to which the above mentioned time delay, expressed in terms of the number of words, is added as an offset, and the resulting sum total of the numbers of words is then converted into the form of hour:minute:second:frame. In this manner, time delay compensation may be realized easily.

As a specific example, if, in the case of the delay time between the input and the output of the D/A converter 32 of 50 words and that between the input and the output of the digital output interfacing circuit 35 of 6 words, the in-line relationship is to be maintained between the analog audio output signals at the output terminal 34 and the time code signal from the output terminal 29, an analog output switching signal is transmitted to the switching control terminal 27 of the delay correction circuit 26 for switching to the 50-word delay state. On the other hand, when it is desired to maintain the above mentioned in-line relationship with respect to the digital audio signals from the output terminal 36, the digital output switching control signal is transmitted to the switching control terminal 27 for switching to the 6-word delay state.

In this manner, by delaying the time code signals in the decoded output signals at the reproducing side by a delay time equal to the delay produced at the D/A converter or by a delay time equal to the delay produced at the digital output interfacing circuit, by way of a delay correction, it becomes possible to maintain the in-line relationship between the main audio output signals and the output time code signals.

It is to be noted that the present invention is not limited to the above described embodiment. For example, the present invention may also be applied to a digital tape recording apparatus provided only with an analog input system or a digital input system in addition to the above mentioned time code signal recording system, or to a digital tape reproducing apparatus provided only with an analog output system or a digital output system in addition to the above mentioned time code signal reproducing system. The main digital signals to be recorded on or reproduced from a rotary head type digital audio tape recorder (R-DAT) are not limited to the digital audio signals, but may also be digital video signals or computer signals in general.

What is claimed is:

1. Apparatus for compensating a phase relationship between an external time code signal and a selectively supplied analogue or digital audio signal for recording said analogue or digital audio signal in phase with said external time code signal, comprising:

digital signal receiving means for receiving said digital audio signal, analog signal receiving means for receiving said analogue audio signal, time code signal receiving means for receiving said external time code signal, analog to digital converter means for converting said analog audio signal to a converted digital audio signal, said analog to digital converter means and said digital signal receiving means exhibiting different time delays, switching means for selecting said digital audio signal or said converted digital audio signal to be recorded, controllable delay means for delaying said external time code signal by a first predetermined delay time when said converted digital audio signal is selected and delaying said external time code signal by a second predetermined delay time when said digital audio signal is selected, signal processing means for processing said delayed external time code signal and said selected digital audio signal for recording, and recording means for recording said processed time code and digital audio signals.

2. The apparatus according to claim 1, in which said recording means records said processed signals on an obliquely extending recording track on a magnetic tape.

3. The apparatus according to claim 2, in which said recording means records said processed selected digital audio signal in a main area of said track and records said processed delayed external time code signal in separate subcode areas of said track.

4. Apparatus for compensating a phase relationship between an external time code signal and a selectively supplied analogue or digital audio signal for recording said analogue or digital audio signal in phase with said external time code signal, comprising:

digital signal receiving means for receiving said digital audio signal, analogue signal receiving means for receiving said analogue audio signal, time code signal receiving means for receiving said external time code signal, analogue to digital converter means for converting said analogue audio signal to a converted digital audio signal, said analogue to digital converter means and said digital signal receiving means exhibiting different time delays, switching means for selecting said digital audio signal or said converted digital audio signal to be recorded, controllable delay means for delaying said external time code signal by a first predetermined delay time when said converted digital audio signal is selected and delaying said external time code signal by a second predetermined delay time when said digital audio signal is selected, signal processing means for processing said delayed external time code signal and said selected digital audio signal for recording, and recording means for recording said processed time code and digital audio signals, in which said first predetermined delay time corresponds to a time delay exhibited by said analogue to digital converter means.

5. The apparatus according to claim 4, wherein said digital signal receiving means includes digital interface means for receiving digital audio signals admitting of a first standard and converting said digital audio standard to a predetermined digital recording format.

6. The apparatus according to claim 5, in which said second predetermined delay time corresponds to an inherent time delay exhibited by said digital interface means.

7. Apparatus for compensating a phase relationship between a recorded time code signal and a recorded digital audio signal whereby the digital audio signal may be reproduced in analogue or digital form in phase with the time code signal which represents the record location of the recorded digital audio signal, comprising:

reproducing means for reproducing the time code and digital audio signals, decoding means for decoding said reproduced signals into said digital audio signal and said time code signal, digital to analog converter means for converting said decoded digital audio signal to an analog audio signal, selecting means for selecting the decoded digital audio signal or the converted analog audio signal as an output signal, controllable delay means for delaying the decoded time code signal by a first predetermined delay time when said analog audio signal is selected as the output signal and for delaying the decoded time code signal by a second predetermined delay time when said digital audio signal is selected as the output signal, and means coupled to said controllable delay means for outputting said time code signal.

8. Apparatus for compensating a phase relationship between a recorded time code signal and a recorded digital audio signal whereby the digital audio signal may be reproduced in analogue or digital form in phase with the time code signal which represents the record location of the recorded digital audio signal, comprising:

reproducing means for reproducing the time code and digital audio signals, decoding means for decoding said reproduced signals into said digital audio signal and said time code signal, digital to analog converter means for converting said decoded digital audio signal to an analog audio signal, selecting means for selecting the decoded digital audio signal or the converted analogue audio signal as an output signal, controllable delay means for delaying the decoded time code signal by a first predetermined delay time when said analog audio signal is selected as the output signal and for delaying the decoded time code signal by a second predetermined delay time when said digital audio signal is selected as the output signal, and means coupled to said controllable delay means for outputting said time code signal, in which said first predetermined delay time corresponds to an inherent time delay exhibited by said digital to analog convertor means.

9. The apparatus according to claim 8, further comprising interface means coupled to receive the decoded digital audio signal and convert same to a predetermined format.

10. The apparatus according to claim 9, in which said second predetermined delay time corresponds to an inherent time delay exhibited by said interface means.

11. Apparatus for compensating a phase relationship between a time code signal and an audio signal recorded on a record medium, comprising:

digital signal receiving means for receiving a digital audio input signal to be recorded, analog signal receiving means for receiving an analog audio input signal to be recorded, time code signal receiving means for receiving an external time code signal to be recorded, analog to digital converter means for converting said analog audio input signal to a converted digital audio signal, record selecting means for selecting said digital audio input signal or said converted digital audio signal for recording, first controllable delay means for delaying said external time code signal by a first predetermined delay time when said converted digital audio signal is selected for recording and for delaying said external time code signal by a second predetermined delay time when said digital audio input signal is selected for recording, signal processing means for processing said delayed external time code signal and said selected digital audio signal for recording, recording means for recording the processed time code and digital audio signals, reproducing means for reproducing the recorded time code and digital audio signals, decoding means for decoding the reproduced digital audio and time code signals, digital to analog converter means for converting the decoded digital audio signal to an analog audio signal, reproduce selecting means for selecting the decoded digital audio signal or said analog audio signal as an audio output signal, second controllable delay means for delaying the decoded time code signal by a third predetermined delay time when said analog audio signal is selected as the audio output signal and for delaying said decoded time code signal by a fourth predetermined delay time when said digital audio signal is selected as the audio output signal, and means coupled to said second controllable delay means for outputting said time code signal.

12. Apparatus for compensating a phase relationship between a time code signal and an audio signal recorded on a record medium, comprising:

digital signal receiving means for receiving a digital audio input signal to be recorded, analog signal receiving means for receiving an analog audio input signal to be recorded, time code signal receiving means for receiving an external time code signal to be recorded, analog to digital converter means for converting said analog audio input signal to a converted digital audio signal, record selecting means for selecting said digital audio input signal or said converted digital audio signal for recording, first controllable delay means for delaying said external time code signal by a first predetermined delay time when said converted digital audio signal is selected for recording and for delaying said external time code signal by a second predetermined delay time when said digital audio input signal is selected for recording, signal processing means for processing said delayed external time code signal and said selected digital audio signal for recording, recording means for recording the processed time code and digital audio signals, reproducing means for reproducing the recorded time code and digital audio signals, decoding means for decoding the reproduced digital audio and time code signals, digital to analog converter means for converting the decoded digital audio signal to an analog audio signal, reproduce selecting means for selecting the decoded digital audio signal or said analog audio signal as an audio output signal, second controllable delay means for delaying the decoded time code signal by a third predetermined delay time when said analog audio signal is selected as the audio output signal and for delaying said decoded time code signal by a fourth predetermined delay time when said digital audio signal is selected as the audio output signal, and means coupled to said second controllable delay means for outputting said time code signal, in which said first predetermined delay time corresponds to an inherent time delay exhibited by said analog to digital converter means and said third predetermined delay time corresponds to an inherent time delay exhibited by said digital to analog converter means.

* * * * *